United States Patent
Kachi (10) Patent No.: US 10,450,904 B2
(45) Date of Patent: Oct. 22, 2019

(54) ABNORMALITY DIAGNOSIS SYSTEM FOR INTERNAL COMBUSTION ENGINE AND ABNORMALITY DIAGNOSIS METHOD FOR INTERNAL COMBUSTION ENGINE

(71) Applicant: TOYOTA JIDOSHA KABUSHIKI KAISHA, Toyota-shi, Aichi-ken (JP)

(72) Inventor: Masahiro Kachi, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 69 days.

(21) Appl. No.: 15/933,911

(22) Filed: Mar. 23, 2018

(65) Prior Publication Data

US 2018/0283233 A1    Oct. 4, 2018

(30) Foreign Application Priority Data

Apr. 4, 2017    (JP) .................................. 2017-074453

(51) Int. Cl.
*F01L 1/00* (2006.01)
*F01L 1/344* (2006.01)
(Continued)

(52) U.S. Cl.
CPC ......... *F01L 1/34409* (2013.01); *F01L 1/3442* (2013.01); *F01L 13/0063* (2013.01);
(Continued)

(58) Field of Classification Search
CPC . F01L 1/34409; F01L 1/3442; F01L 13/0063; F01L 2088/11; F01L 2088/01; F02D 41/221; F02D 41/1498; F02D 41/042; F02D 41/22; F02D 41/062; F02D 13/0226; F02D 2041/001; F02D 2041/228;
(Continued)

(56) References Cited

U.S. PATENT DOCUMENTS 6,134,488 A * 10/2000 Sasaki .................... B60K 23/00
701/32.8
2006/0224283 A1* 10/2006 Fussey .................... F02D 41/22
701/31.4
(Continued)

FOREIGN PATENT DOCUMENTS

JP    2010-138738 A    6/2010

*Primary Examiner* — Hieu T Vo
*Assistant Examiner* — Sherman D Manley
(74) *Attorney, Agent, or Firm* — Oliff PLC (57) ABSTRACT

An abnormality diagnosis system of an internal combustion engine that is installed on a vehicle and includes an actuator includes an electronic control unit. The electronic control unit receives vehicle outside information concerning a period of time for which the vehicle speed is less than a predetermined value, and determines whether the period for which the vehicle speed is less than the predetermined value is expected to be equal to or longer than a length of time required for an abnormality diagnosis of an abnormality diagnosis target device. The electronic control unit activates the actuator and starts the abnormality diagnosis as the vehicle speed becomes lower than the predetermined value, when it determines that the period for which the vehicle speed is lower than the predetermined value is expected to be equal to or longer than the time required for the abnormality diagnosis of the target device.

6 Claims, 4 Drawing Sheets

(51) Int. Cl.
   *F02D 41/06*  (2006.01)
   *F02D 41/22*  (2006.01)
   *F02D 41/04*  (2006.01)
   *F01L 13/00*  (2006.01)
   *F02D 13/02*  (2006.01)
   *F02D 41/14*  (2006.01)
   *F02D 41/00*  (2006.01)

(52) U.S. Cl.
   CPC ....... *F02D 13/0226* (2013.01); *F02D 41/042* (2013.01); *F02D 41/062* (2013.01); *F02D 41/1498* (2013.01); *F02D 41/22* (2013.01); *F02D 41/221* (2013.01); *F01L 2800/01* (2013.01); *F01L 2800/11* (2013.01); *F02D 13/0203* (2013.01); *F02D 2041/001* (2013.01); *F02D 2041/228* (2013.01); *F02D 2200/501* (2013.01); *F02D 2200/701* (2013.01); *Y02T 10/18* (2013.01); *Y02T 10/40* (2013.01)

(58) Field of Classification Search
   CPC ......... F02D 2200/701; F02D 2200/501; F02D 13/0203; Y02T 10/40; Y02T 10/18
   See application file for complete search history.

(56) References Cited

U.S. PATENT DOCUMENTS

| | | | |
|---|---|---|---|
| 2010/0030447 A1* | 2/2010 | Smyth | B60W 10/06 701/102 |
| 2010/0043404 A1* | 2/2010 | Hebbale | F01N 9/00 60/286 |
| 2010/0139601 A1 | 6/2010 | Takamiya et al. | |
| 2014/0150756 A1* | 6/2014 | Smith | F02M 31/205 123/563 |
| 2014/0330482 A1* | 11/2014 | Yang | G07C 5/00 701/34.4 |
| 2015/0206360 A1* | 7/2015 | Schnurr | B60W 50/0097 701/29.1 |
| 2017/0176280 A1* | 6/2017 | Joshi | G01L 27/007 |

* cited by examiner

ABNORMALITY DIAGNOSIS SYSTEM FOR INTERNAL COMBUSTION ENGINE AND ABNORMALITY DIAGNOSIS METHOD FOR INTERNAL COMBUSTION ENGINE

INCORPORATION BY REFERENCE

The disclosure of Japanese Patent Application No. 2017-074453 filed on Apr. 4, 2017 including the specification, drawings and abstract is incorporated herein by reference in its entirety.

BACKGROUND

1. Technical Field

The disclosure relates to an abnormality diagnosis system for an internal combustion engine installed on a vehicle, or the like, and an abnormality diagnosis method for the internal combustion engine.

2. Description of Related Art

It is known that an abnormality diagnosis (which may be referred to as "active test") is conducted on each device that belongs to an internal combustion engine installed on a vehicle, or the like A technology pertaining to an active test (VVT active test) of a variable valve mechanism is disclosed in Japanese Patent Application Publication No. 2010-138738 (JP 2010-138738 A). More specifically, in order to conduct a VVT active test without affecting operation of an engine, the engine is started after a lapse of a given delay time from a point in time at which an engine starting switch is operated, and the VVT active test is conducted during the delay time.

SUMMARY

However, according to JP 2010-138738 A, the VVT active test is carried out only during the limited delay time after the engine starting switch is operated, until when the engine is started. Therefore, if an abnormality occurs in the middle of one trip, an abnormality determination (a determination that the abnormality occurs) is delayed. Namely, the abnormality determination cannot be made until the engine is started next time.

Generally, the active test is conducted by operating an abnormality diagnosis target device (the variable valve mechanism in the case of JP 2010-138738 A) for the sake of the active test, in a situation where the abnormality diagnosis target device usually does not operate (e.g., during stopping of the vehicle or during traveling at a low vehicle speed). Therefore, it is difficult to normally complete the active test, unless a sufficient period of time is ensured in which no request for operation of the abnormality diagnosis target device (operation request resulting from starting or acceleration of the vehicle, for example; which will be called "normal operation request") is generated. Namely, if the normal operation request is generated on the abnormality diagnosis target device in the middle of the active test, operation that has been performed in the active test will be wasted. In particular, when the normal operation request is generated on the abnormality diagnosis target device in the middle of the active test, a certain period of time is required to return the abnormality diagnosis target device to an operating state suitable for the normal operation request (for example, return the valve opening and closing timing to the timing suitable for the engine load, or the like, where the VVT active test has been conducted). In this case, the response of the engine may be impaired or reduced in the above period.

This disclosure provides an abnormality diagnosis system for an internal combustion engine and an abnormality diagnosis method for the internal combustion engine, which make it possible to carry out an active test at a high frequency, and normally complete the active test without wasting it.

A first aspect of the disclosure provides an abnormality diagnosis system for an internal combustion engine. The internal combustion engine is installed on a vehicle, and includes an actuator. The abnormality diagnosis system includes an electronic control unit. The electronic control unit is configured to receive vehicle outside information concerning a period of time for which a vehicle speed is less than a predetermined value. The electronic control unit is configured to determine whether the period of time for which the vehicle speed is less than the predetermined value is expected to be equal to or longer than a length of time required for an abnormality diagnosis of an abnormality diagnosis target device. The electronic control unit is configured to activate the actuator and start the abnormality diagnosis of the abnormality diagnosis target device as the vehicle speed becomes lower than the predetermined value, when the electronic control unit determines that the period of time for which the vehicle speed is lower than the predetermined value is expected to be equal to or longer than the length of time required for the abnormality diagnosis of the abnormality diagnosis target device.

The electronic control unit configured as described above receives the vehicle outside information concerning the period of time for which the vehicle speed is less than the predetermined value, and activates the actuator and starts an abnormality diagnosis of the abnormality diagnosis target device as the vehicle speed becomes less than the predetermined value, when the period of time for which the vehicle speed is less than the predetermined value is expected to be equal to or longer than the time required for the abnormality diagnosis of the abnormality diagnosis target device. In this case, a diagnosis period (a period for which the vehicle speed is less than the predetermined value) sufficient to complete the abnormality diagnosis of the abnormality diagnosis target device is secured, and a normal operation request is less likely or unlikely to be generated on the abnormality diagnosis target device in the middle of the abnormality diagnosis. Therefore, the abnormality diagnosis can be normally completed without being wasted. Also, since the abnormality diagnosis is carried out each time the period for which the vehicle speed is less than the predetermined value is expected to be equal to or longer than the time required for the abnormality diagnosis of the abnormality diagnosis target device) (in the related art, the abnormality diagnosis is carried out only during engine start-up), the abnormality diagnosis can be conducted at a high frequency, and an abnormality determination (a determination as to occurrence of an abnormality) can be made at an early opportunity.

A second aspect of the disclosure provides an abnormality diagnosis method for an internal combustion engine. The internal combustion engine is installed on a vehicle, and includes an actuator. The vehicle includes an electronic control unit. The abnormality diagnosis method includes: receiving vehicle outside information concerning a period of time for which a vehicle speed is less than a predetermined value, by the electronic control unit; determining, by the electronic control unit, whether the period of time for which the vehicle speed is less than the predetermined value is expected to be equal to or longer than a length of time required for an abnormality diagnosis of an abnormality diagnosis target device; and activating the actuator and starting the abnormality diagnosis of the abnormality diagnosis target device as the vehicle speed becomes lower than the predetermined value, when the electronic control unit determines that the period of time for which the vehicle speed is lower than the predetermined value is expected to be equal to or longer than the length of time required for the abnormality diagnosis of the abnormality diagnosis target device.

With the above method, substantially the same effects as those of the first aspect can be obtained.

According to the disclosure, when the period of time for which the vehicle speed is less than the predetermined value is expected to be equal to or longer than the time required for an abnormality diagnosis of the abnormality diagnosis target device, the actuator is activated so as to start the abnormality diagnosis of the abnormality diagnosis target device at the same time that the vehicle speed becomes less than the predetermined value. Therefore, the abnormality diagnosis can be normally completed without being wasted, and the frequency of the abnormality diagnosis can be increased, so that an abnormality determination can be made at an early opportunity.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Some embodiments of the disclosure will be described based on the drawings.

First Embodiment

In this embodiment, the disclosure is applied to an automotive engine including a variable valve timing (VVT) mechanism on the intake side, in which a VVT active test is carried out while the vehicle is stopped.

General Configuration of Engine

Figure 1:
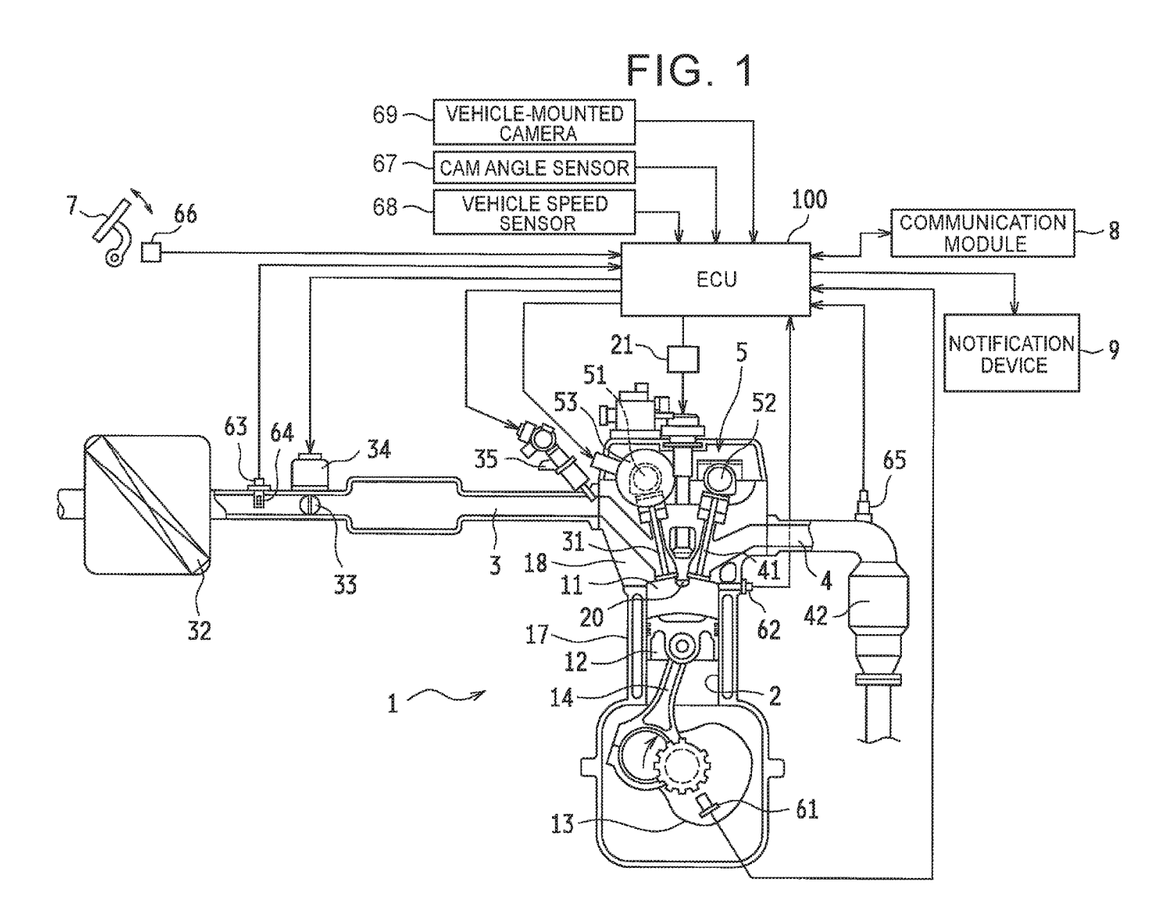
FIG. 1 is a view showing the general configuration of an engine according to one embodiment.

FIG. 1 shows the general configuration of an engine 1 according to this embodiment. The engine 1 is a multicylinder gasoline engine, and a piston 12 is received in each cylinder 2 so as to define a combustion chamber 11. The piston 12 and a crankshaft 13 are connected by a connecting rod 14, and a crank angle sensor 61 that detects the rotational angle (crank angle) of the crankshaft 13 is placed in a lower part of a cylinder block 17.

On the other hand, a cylinder head 18 is fastened to the top of the cylinder block 17, and closes the upper end of each cylinder 2. An ignition plug 20 is placed in the cylinder head 18 so as to be exposed to the interior of the cylinder 2, and is operable to perform spark discharge when a high voltage is supplied from an ignitor 21 controlled by an ECU 100 that will be described later, to the plug 20. A water temperature sensor 62 that detects the coolant temperature of the engine 1 is placed on an upper part of a side wall of the cylinder block 17.

An intake passage 3 and an exhaust passage 4 are provided such that they communicate with the combustion chamber 11 of each cylinder 2. A downstream portion (on the downstream side of intake airflow) of the intake passage 3 provides an intake port disposed in the cylinder head 18, and an intake valve 31 is placed in an opening of the intake port which is exposed to the combustion chamber 11. Similarly, an upstream portion (on the upstream side of exhaust flow) of the exhaust passage 4 provides an exhaust port, and an exhaust valve 41 is placed in an opening of the exhaust port. A valve operating system 5 for operating the intake valve 31 and the exhaust valve 41 is provided in the cylinder head 18.

In this embodiment, for example, two camshafts 51, 52 are provided for driving the intake valve 31 an the exhaust valve 41, respectively, and the camshafts 51, 52 are driven by the crankshaft 13 via a timing chain (not shown), or the like, so that the intake valve 31 and the exhaust valve 41 are opened and closed at respective predetermined times. The intake camshaft 51 is provided with a VVT mechanism 53 as a variable valve mechanism that is one form of an abnormality diagnosis target device according to the disclosure.

In the intake passage 3, an air cleaner 32, air flow meter 63 that detects the flow rate of intake air (intake air amount), intake air temperature sensor 64 (incorporated in the air flow meter 63 as one example), and an electronically controlled throttle valve 33 are placed in the order of description as seen from the upstream side of the intake passage 3. The throttle valve 33 is driven by a throttle motor 34, and restricts flow of the intake air so as to adjust the intake air amount of the engine 1, and the opening (throttle opening) of the throttle valve 33 is controlled by the ECU 100 that will be described later.

Also, an injector 35 for use in fuel injection is placed in the intake passage 3 with respect to each cylinder 2, and the injector 35 is controlled by the ECU 100 that will be described later, so as to inject fuel into the intake passage 3. The fuel thus injected is mixed with the intake air, and the mixture is drawn into the cylinder 2, and ignited by the ignition plug 20 in the combustion chamber 11, to be burned. Then, burned gas generated in the combustion chamber 11 flows out into the exhaust passage 4, and is cleaned by a catalytic converter 42. An air-fuel ratio sensor 65 is placed on the upstream side of the catalytic converter 42.

Configuration of VVT Mechanism

Figure 2:
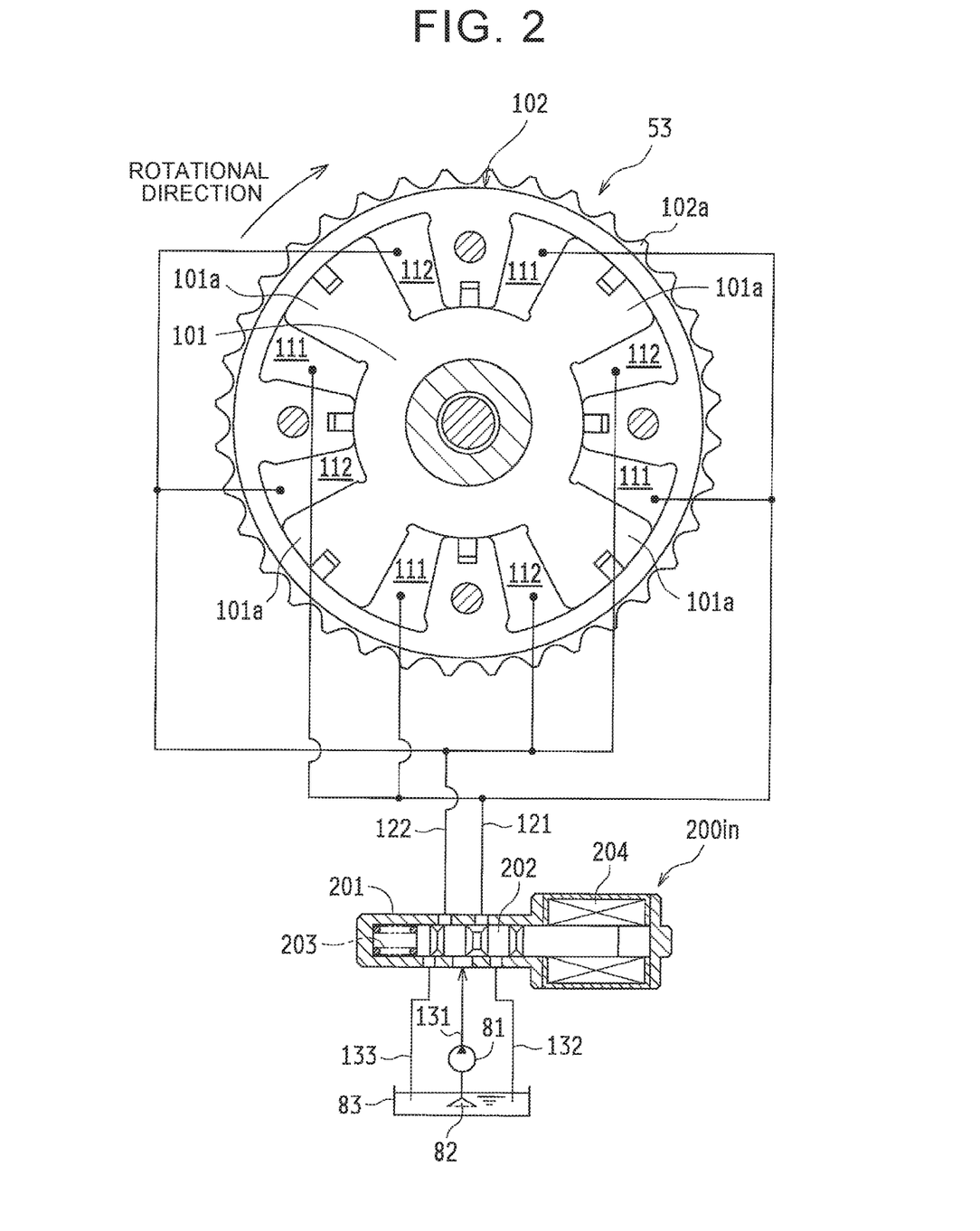
FIG. 2 is a view useful for explaining a VVT mechanism and an OCV that controls the VVT mechanism.

Next, the VVT mechanism (intake-side VVT mechanism; the abnormality diagnosis target device according to the disclosure) 53, and an OCV (oil control valve; the actuator according to the disclosure) 200*in* that controls the VVT mechanism 53 will be described.

As shown in FIG. 2, the VVT mechanism 53 includes a vane rotor 101, and a housing 102 in which the vane rotor 101 is housed. The vane rotor 101 is coupled to the intake camshaft 51 (see FIG. 1). The housing 102 is provided with a timing sprocket 102*a*, and the timing sprocket 102*a* is connected to the crankshaft 13 (see FIG. 1) via a timing chain (not shown). In the interior of the housing 102, advance-side hydraulic chambers 111 and retard-side hydraulic chambers 112 separated by vanes 101a of the vane rotor 101 are formed.

In the VVT mechanism 53, the vane rotor 101 rotates relative to the housing 102, according to the hydraulic pressure in the advance-side hydraulic chambers 111 and the hydraulic pressure in the retard-side hydraulic chambers 112. Namely, when the hydraulic pressure in the advance-side hydraulic chambers 111 is made higher than the hydraulic pressure in the retard-side hydraulic chambers 112, the rotational phase of the intake camshaft 51 is advanced relative to the rotational phase of the crankshaft 13. Conversely, when the hydraulic pressure in the retard-side hydraulic chambers 112 is made higher than the hydraulic pressure in the advance-side hydraulic chambers 111, the rotational phase of the intake camshaft 51 is retarded relative to the rotational phase of the crankshaft 13. Thus, the valve timing of the intake valve 31 can be varied through adjustment of the rotational phase of the intake camshaft 51 relative to the crankshaft 13.

The OCV 200in that controls the hydraulic pressures of hydraulic oil supplied to the advance-side hydraulic chambers 111 and the retard-side hydraulic chambers 112 is connected to the VVT mechanism 53.

The hydraulic oil is pumped up from an oil pan 83 via an oil strainer 82, and is supplied via an oil supply passage 131 to the OCV 200in, by means of an oil pump 81. The OCV 200in is connected to the advance-side hydraulic chambers 111 via an advance-side passage 121, and is connected to the retard-side hydraulic chambers 112 via a retard-side passage 122. Also, two oil discharge passages 132, 133 are connected to the OCV 200in. The OCV 200in is an electromagnetically driven flow control valve, and is controlled by the ECU 100 (see FIG. 1).

The OCV 200in includes a spool 202 that is reciprocably placed inside a casing 201, a compression coil spring 203 that biases the spool 202 to one side, and an electromagnetic solenoid 204 for moving the spool 202 to the other side, against the bias force of the compression coil spring 203.

In the OCV 200in, when the spool 202 is moved, the amounts of the hydraulic oil supplied to and discharged from the advance-side passage 121 and the retard-side passage 122 are changed, so that the hydraulic pressures in the advance-side hydraulic chambers 111 and the retard-side hydraulic chambers 112 can be adjusted.

ECU

Although not illustrated in the drawings, the electronic control unit (ECU) 100 includes a central processing unit (CPU), read-only memory (ROM), random access memory (RAM), backup RAM, and so forth. The CPU performs various computations based on control programs and maps stored in the ROM. The RAM temporarily stores computation results obtained by the CPU, and data, etc. received from sensors, and the backup RAM stores data, etc. that should be stored when the engine 1 is stopped, for example.

To the ECU 100 are connected the crank angle sensor 61, water temperature sensor 62, air flow meter 63, intake air temperature sensor 64, air-fuel ratio sensor 65, etc., as described above with reference to FIG. 1. Also, an accelerator pedal position sensor 66 that detects the operation amount (accelerator pedal stroke) of an accelerator pedal 7 provided in the vehicle cabin, a cam angle sensor 67 that detects the rotational phase of the intake camshaft 51, a vehicle speed sensor 68 that detects the vehicle speed, a vehicle-mounted camera 69 that captures images in front of the vehicle, etc. are connected to the ECU 100. For example, the vehicle-mounted camera 69 is constituted by charge coupled devices (CCD), complementary metal oxide semiconductors (CMOS), or the like. The vehicle-mounted camera 69 is used for recognizing a display color (which may also be referred to as "light color") of a traffic light installed at an intersection, or the like, in front of the vehicle. Although not illustrated in the drawings, sensors and switches other than those as described above, which are used for controlling operation of the engine 1, are also connected to the ECU 100.

The ECU 100 executes various control programs, based on signals received from the above-indicated various sensors 61-68, vehicle-mounted camera 69, switches, and so forth, so as to control operating conditions of the engine 1. For example, the ECU 100 calculates torque required to be produced by the engine 1, based on the accelerator pedal stroke and the load and rotational speed of the engine 1, or the vehicle speed, etc., and performs control of the ignition timing by means of the ignitor 21, and control of the throttle opening by means the throttle motor 34 (namely, control of the intake air amount), and control of fuel injection by means of the injector 35, for example.

A communication module 8 and a notification device 9 are also connected to the ECU 100. The communication module 8 receives information (e.g., traffic light information that will be described later) from an optical beacon in driving safety support systems (DSSS) that will be described later, and sends the information to the ECU 100. The notification device 9 may be in the form of a malfunction indication lamp (MIL) (warning lamp), or the like, on a meter panel in the vehicle cabin, and is operable to provides the driver with a warning, or the like.

DSSS

Next, the DSSS will be described, referring to FIG. 3. When the vehicle stops in response to a traffic light that is "red" at an intersection, for example, the DSSS provides the vehicle with information about time it takes until the traffic light turns "green".

Figure 3:
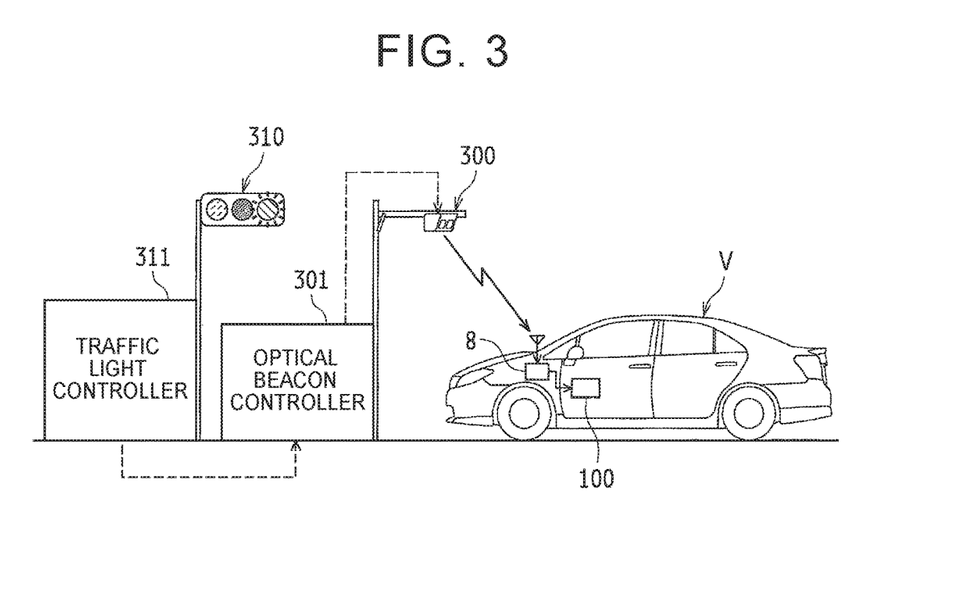
FIG. 3 is a view useful for explaining DSSS.

As shown in FIG. 3, the DSSS provides the vehicle V with information (traffic light information), using an optical beacon (roadside machine) installed at an intersection. Namely, the optical beacon 300 includes an optical beacon controller 301, and sends signal cycle information obtained from a traffic light controller 311 included in the traffic light 310, toward the vehicle V. In this manner, the ECU 100 receives the signal cycle information via the communication module 8 of the vehicle V. The information provided by the optical beacon 300 includes not only the traffic light information, but also information about the presence or absence of an oncoming vehicle at the intersection, information about the presence or absence of a pedestrian on a crossing, and other information.

Figure 4:
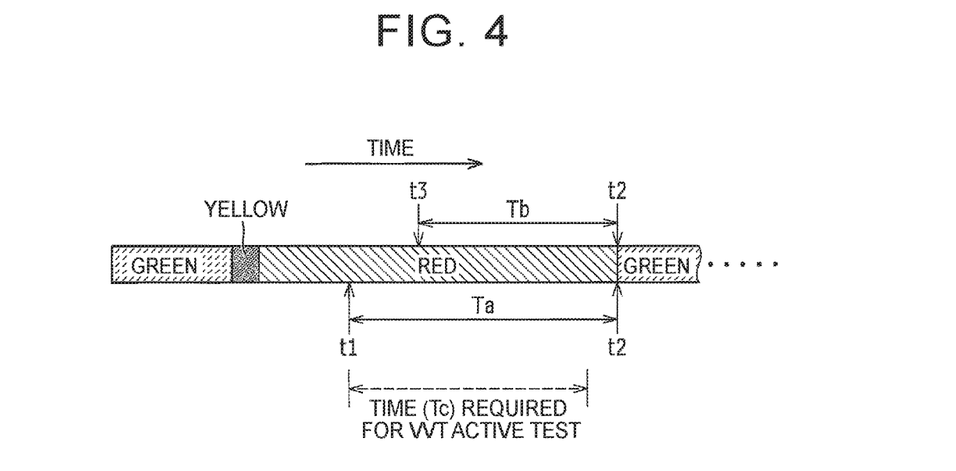
FIG. 4 is a view showing one example of signal cycle information of a traffic light.

FIG. 4 shows one example of signal cycle information transmitted from the optical beacon 300. In FIG. 3, the time axis is set from the left-hand side to the right-hand side, and indicated. As shown in FIG. 4, the signal cycle information includes the types of light colors (signal light colors) of the traffic light 310, and the lighting time (in seconds) of each of the light colors.

More specifically, information about a length of time for which the light color of the traffic light 310 is "green", time for which it is "yellow", and time for which it is "red", is transmitted from the optical beacon 300. With this information, when the vehicle V stops at the traffic light 310 of which the light color is "red", it is possible to recognize time it takes until the light color of the traffic light 310 turns "green". For example, when the vehicle V stops at a point in time t1 in FIG. 4, it can recognize that the time (down to a point in time t2) it takes for the light color of the traffic light 310 to turn from "red" to "green" next time is "Ta" in FIG. 4.

VVT Active Test

Next, the VVT active test as a feature of this embodiment will be described.

The VVT active test is to determine whether operation of the VVT mechanism 53 is normally performed over the entire range in which the opening and closing timing of the intake valve 31 can be varied, by sending a command signal (e.g., a duty control signal) that shifts the opening and closing timing of the intake valve 31 to the most retarded timing after shifting it to the most advanced timing, or a command signal that shifts the opening and closing timing of the intake valve 31 to the most advanced timing after shifting it to the most retarded timing, during a period in which the vehicle V is stopped. Therefore, the VVVT active test requires a given length of time (e.g., about 30 seconds). Namely, the VVVT active test requires time it takes for the opening and closing timing of the intake valve 31 to be shifted to the most retarded timing after being shifted to the most advanced timing, or time it takes for the opening and closing timing of the intake valve 31 to be shifted to the most advanced timing after being shifted to the most retarded timing.

In JP 2010-138738 A identified above, when an engine ignition switch is operated, the engine is started after a lapse of a given delay time from a point in time at which the switch is operated, and the VVT active test is conducted during the delay time. Therefore, the VVT active test is conducted only during the limited delay time from when the engine ignition switch is operated, until when the engine is started. Namely, when an abnormality occurs in the course of one trip, an abnormality determination (a determination of occurrence of an abnormality) may be delayed.

Also, the VVT active test is conducted by operating the VVT mechanism for the VVT active test, in a situation where the VVT mechanism is usually not operated (while the vehicle is stopped). Therefore, it is difficult to normally complete the VVT active test, unless the vehicle is under a situation where a sufficient length of time is ensured in which no request for operation of the VVT mechanism (operation request resulting from starting, etc. of the vehicle, or normal operation request) is generated.

In view of the above point, according to this embodiment, the VVT active test can be carried out at a high frequency, and the VVT active test can be normally completed without being wasted.

More specifically, the ECU 100 receives vehicle outside information (traffic light information from the optical beacon 300) concerning a vehicle stoppage period (a period of time from when the vehicle V stops at a red traffic light until when the light color of the traffic light 310 turns from "red" to "green"), and determines whether the vehicle stoppage period is expected to be equal to or longer than the length of time required for the VVT active test. If the vehicle stoppage period is expected to be equal to or longer than the time required for the VVT active test, the OCV 200in is activated and the VVT active test is started, at the same time that the vehicle V stops.

Thus, the ECU 100 is configured to receive the vehicle outside information concerning a period of time for which the vehicle speed is less than a predetermined value, and determine whether the period of time for which the vehicle speed is less than the predetermined value is expected to be equal to or longer than the length of time required for an abnormality diagnosis of the abnormality diagnosis target device.

When the vehicle stoppage period is expected to be equal to or longer than the time required for the VVT active test, the ECU 100 activates the OCV 200in and starts the VVT active test, at the same time that the vehicle V stops. Thus, the ECU 100 is configured to activate the actuator and start the abnormality diagnosis of the abnormality diagnosis target device as the vehicle speed becomes less than the predetermined value, when the ECU 100 determines that the period of time for which the vehicle speed is less than the predetermined value is expected to be equal to or longer than the time required for the abnormality diagnosis of the abnormality diagnosis target device.

Figure 5:
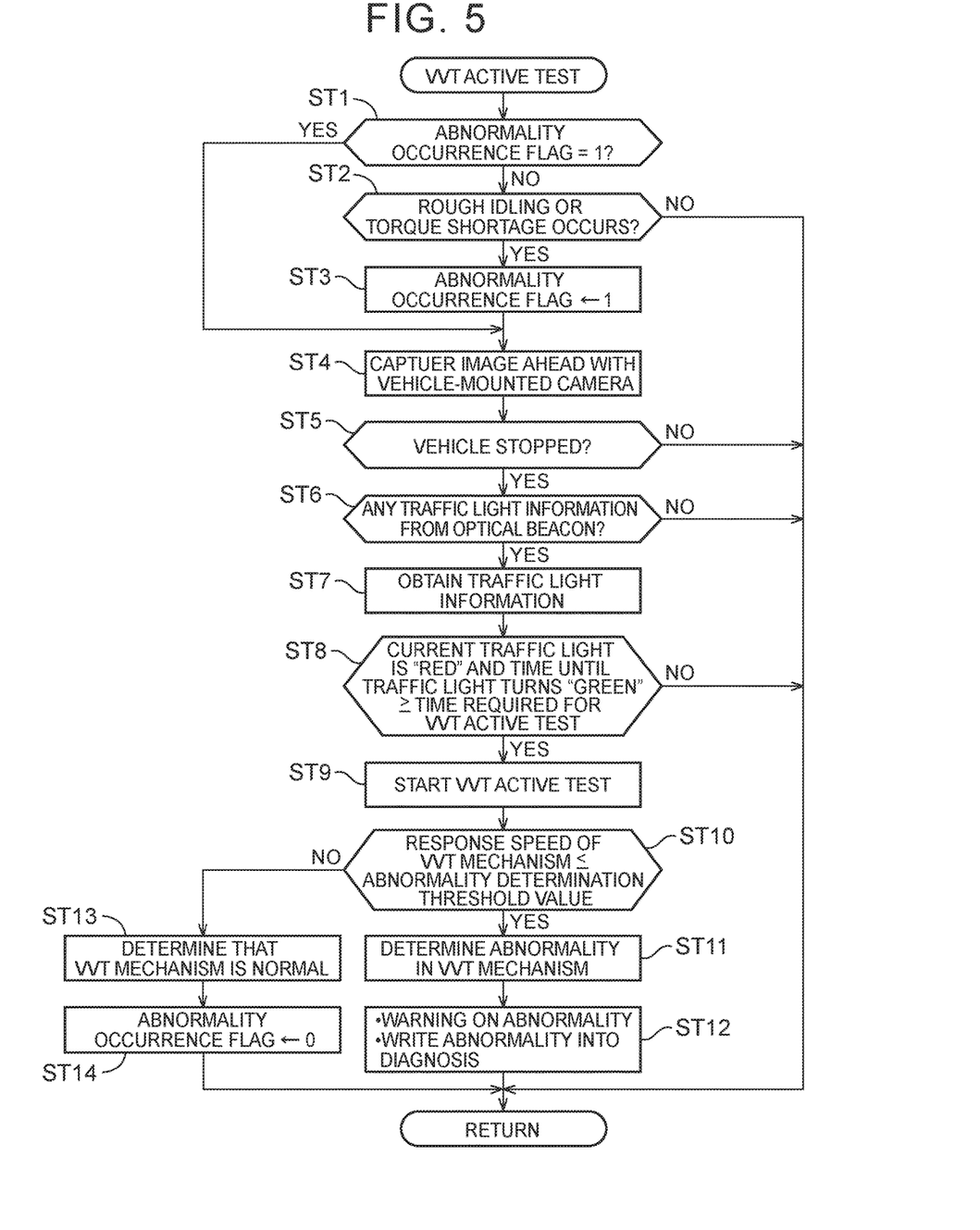
FIG. 5 is a flowchart illustrating a control procedure of a VVT active test.

Next, a control procedure of the VVT active test according to this embodiment will be described according to the flowchart of FIG. 5. After a start switch of the vehicle V is turned on, the control procedure of the flowchart is repeatedly carried out by the ECU 100 at given time intervals. At a point in time when the start switch is turned on, an abnormality occurrence flag that will be described later is reset to "0".

Initially, in step ST1, the ECU 100 determines whether the abnormality occurrence flag stored in advance in the ECU 100 is set to "1". The abnormality occurrence flag is set to "1" when rough idling or shortage of torque occurs in the engine 1.

Since the abnormality occurrence flag is reset to "0" at the time when the start switch is turned on, a negative decision (NO) is obtained in step ST1, and the ECU 100 goes to step ST2. In step ST2, the ECU 100 determines whether rough idling occurs in the engine 1, or a shortage of torque of the engine 1 occurs. When there is an abnormality (such as clogging of a hydraulic circuit that leads to the OCV 200in, or a communication error of a control signal from the ECU 100) in the VVT mechanism 53, rough idling or shortage of torque occurs in the engine 1; therefore, the above determination of step ST2 is made so as to determine whether there is a possibility of occurrence of an abnormality in the VVT mechanism 53.

To determine whether rough idling occurs in the engine 1, the ECU 100 calculates the range of variation in the engine speed during idling of the engine 1, based on an output signal from the crank angle sensor 61, and determines that rough idling occurs in the engine if the range of variation in the engine speed exceeds a predetermined threshold value. To determine whether a shortage of torque of the engine 1 occurs, the ECU 100 determines whether torque of the engine 1 commensurate with the accelerator pedal stroke (required torque amount) is produced, based on the accelerator pedal stroke detected by the accelerator pedal position sensor 66, the vehicle speed detected by the vehicle speed sensor 68, etc., and determines that a shortage of torque of the engine 1 occurs when the torque produced is smaller than the required torque amount by a predetermined threshold value or larger.

If neither rough idling of the engine 1 nor torque shortage of the engine 1 occurs, and a negative decision (NO) is obtained in step ST2, the ECU 100 determines that the VVT mechanism 53 operates normally, and there is no need to conduct the VVT active test. In this case, the ECU 100 goes to "RETURN".

On the other hand, if rough idling of the engine 1 or torque shortage of the engine 1 occurs, and an affirmative decision (YES) is obtained in step ST2, the ECU 100 goes to step ST3 so as to set the abnormality occurrence flag to "1", and goes to step ST4.

In step ST4, the ECU 100 causes the vehicle-mounted camera 69 to capture an image in front of the vehicle. Namely, when there is an intersection in front of the vehicle, the ECU 100 obtains information about the light color of the traffic light 310 installed at the intersection.

After obtaining the information about the light color of the traffic light 310 in this manner, the ECU 100 goes to step ST5, and determines whether the vehicle V has stopped. Namely, the ECU 100 determines whether the vehicle V has stopped at the intersection, because the light color of the traffic light 310 as the information obtained in step ST4 is "red". The determination of step ST5 is made based on an output signal from the vehicle speed sensor 68.

If the vehicle V has not stopped, and a negative decision (NO) is obtained in step ST5, the ECU 100 determines that the vehicle V has not reached the intersection, or the vehicle V has reached the intersection, but passed the intersection since the light color of the traffic light 310 is "green" or "yellow". In this case, the ECU 100 goes to "RETURN" without executing further steps.

If the vehicle V stops, and an affirmative decision (YES) is obtained in step ST5, the ECU 100 goes to step ST6, and determines whether there is traffic light information from the optical beacon 300. Namely, the ECU 100 determines whether the optical beacon 300 is installed at the intersection where the vehicle stopped, and information (traffic light information) about a period for which the light color of the traffic light 310 is "red" can be obtained from the optical beacon 300.

If there is no traffic light information from the optical beacon 300, and a negative decision (NO) is obtained in step ST6, the ECU 100 determines that the optical beacon 300 is not installed at the intersection where the vehicle V stopped, and goes to "RETURN" without executing further steps.

If there is traffic light information from the optical beacon 300, and an affirmative decision (YES) is obtained in step ST6, the ECU 100 goes to step ST7, and obtains the traffic light information. Namely, the ECU 100 obtains information about the period for which the light color of the traffic light 310 is "red". More specifically, the ECU 100 obtains information about time it takes until the light color of the traffic light 310 turns from "red" to "green".

In step ST8, the ECU 100 determines whether the current light color of the traffic light 310 is "red", and the time it takes until the light color turns from "red" to "green" (a length of time from when the vehicle V stops until when the light color of the traffic light 310 turns "green") is equal to or longer than the time (e.g., about 30 sec.) required for the VVT active test. Namely, the ECU 100 determines whether, if a VVT active test is carried out, the VVT active test can be completed, during the period in which the light color of the traffic light 310 is "red".

For example, in FIG. 4, if the vehicle V stops at time t1 where the time required for the VVT active test is Tc (see a period indicated by an arrow of a broken line) in FIG. 4, the time (down to time t2) it takes until the light color of the traffic light 310 turns from "red" to "green" next time is indicated by Ta in FIG. 4, and the time Ta is longer than the time Tc (time required for the VVT active test) (Ta>Tc). Therefore, the ECU 100 determines that the time (the stoppage period of the vehicle V) it takes until the light color of the traffic light 310 turns from "red" to "green" is equal to or longer than the time required for the VVT active test. On the other hand, if the vehicle V stops at time t3 in FIG. 4, the time (down to time t2) it takes until the light color of the traffic light 310 turns from "red" to "green" next time is indicated by Tb in FIG. 4, and the time Tb is shorter than the time Tc (Tb<Tc). Therefore, the ECU 100 determines that the time (the stoppage period of the vehicle V) it takes until the light color of the traffic light 310 turns from "red" to "green" is less than the time required for the VVT active test.

If a negative decision (NO) is obtained in step ST8 (if the ECU 100 determines that, if a VVT active test is carried out, the VVT active test cannot be completed, during the period in which the light color of the traffic light 310 is "red"), the ECU 100 goes to "RETURN" without carrying out the VVT active test.

On the other hand, if an affirmative decision (YES) is obtained in step ST8 (the ECU 100 determines that, if a VVT active test is carried out, the VVT active test can be completed, during the period in which the light color of the traffic light 310 is "red"), the ECU 100 goes to step ST9, and starts the VVT active test. Namely, the ECU 100 sends a command signal for shifting the opening and closing timing of the intake valve 31 to the most retarded timing after shifting it to the most advanced timing, for example, to the VVT mechanism 53 (more specifically, the OCV 200$in$), so as to determine whether operation of the VVT mechanism 53 is normally performed over the entire range in which the opening and closing timing of the intake valve 31 can be varied.

After the VVT active test is started in the above manner, the ECU 100 goes to step ST10, and determines whether the speed of response of the VVT mechanism 53 to the command signal transmitted from the ECU 100 is equal to or lower than a preset abnormality determination threshold value. More specifically, the ECU 100 detects change of the rotational phase of the intake camshaft 51 based on an output signal from the cam angle sensor 67, and determines whether the amount of change of the rotational phase per unit time is equal to or smaller than the abnormality determination threshold value.

If the response speed of the VVT mechanism 53 exceeds the abnormality determination threshold value, and a negative decision (NO) is obtained in step ST10, the ECU 100 goes to step ST13, and determines that the VVT mechanism 53 is normal. Then, the ECU 100 resets the abnormality occurrence flag to "0" in step ST14, and goes to "RETURN". In this case, the rough idling or torque shortage of the engine 1 may be caused by a device(s) other than the VVT mechanism 53; therefore, it is preferable to conduct an abnormality diagnosis on the other devices.

On the other hand, if the response speed of the VVT mechanism 53 is equal to or lower than the abnormality determination threshold value, and an affirmative decision (YES) is obtained in step ST10, the ECU 100 goes to step ST11, and determines that an abnormality occurs in the VVT mechanism 53. Then, in step ST12, the MIL (warning light) on the meter panel in the vehicle cabin is turned on, so as to provide the driver with a warning (to the effect that an abnormality occurs in the VVT mechanism 53), and malfunction information is written into a diagnosis included in the ECU 100. Then, the ECU 100 goes to "RETURN".

The operation as described above is repeated at given time intervals.

When the MIL is turned on as described above, the vehicle V is brought into a car dealer, repair shop, or the like, and maintenance is done on the VVT mechanism 53. At this time, after completion of the maintenance, the abnormality occurrence flag is reset to "0", through worker's operation to rewrite data in the ECU 100.

In the control procedure as described above, operation of step ST8 above is one example of "operation of the electronic control unit to receive vehicle outside information concerning the time for which the vehicle speed is less than the predetermined value, and determine whether the time for which the vehicle speed is less than the predetermined value is expected to be equal to or longer than the length of time required for abnormality diagnosis of the abnormality diagnosis target device". Also, operation of step ST9 above is one example of "operation of the electronic control unit to activate the actuator and start an abnormality diagnosis of the abnormality diagnosis target device as the vehicle speed becomes lower than the predetermined value, when the electronic control unit determines that the time for which the vehicle speed is less than the predetermined value is expected to be equal to or longer than the length of time required for abnormality diagnosis of the abnormality diagnosis target device".

As described above, in this embodiment, the ECU 100 receives the vehicle outside information concerning the vehicle stoppage period (the traffic light information from the optical beacon 30), and activates the OCV 200$in$ and starts the VVT active test at the same time that the vehicle V stops, when the vehicle stoppage period is expected to be equal to or longer than the time required for the VVT active test. In this case, a diagnosis period (vehicle stoppage period) sufficient for completion of the VVT active test is secured, and a normal operation request is less likely or unlikely to be generated on the VVT mechanism 53 in the middle of the VVT active test. Therefore, the VVT active test can be normally completed without being wasted. Also, the VVT active test is carried out each time the vehicle stoppage period is expected to be equal to or longer than the time required for the VVT active test; therefore, the VVT active test can be conducted at a high frequency, and an abnormality determination (a determination as to occurrence of an abnormality in the VVT mechanism 53) can be made at an early opportunity.

Also, in this embodiment, the ECU 100 carries out the VVT active test, after confirming, via the vehicle-mounted camera 69, that the light color of the traffic light 310 is "red", and obtaining information about the time it takes until the light color of the traffic light 310 turns from "red" to "green", based on the traffic light information from the optical beacon 300. Therefore, it is reliably assured that the vehicle V is stopped because the color of the traffic light 310 in front of the vehicle is "red", and it can be determined with increased reliability that the period of time for which the vehicle V is stopped is equal to or longer than the time required for the VVT active test.

Second Embodiment

Next, a second embodiment will be described. In the first embodiment as described above, when the vehicle V stops because the light color of the traffic light 310 is "red", the ECU 100 determines whether the time it takes until the light color of the traffic light 310 turns from "red" to "green" is equal to or longer than the time required for the VVT active test. In this embodiment, the ECU 100 determines whether traffic congestion occurs on a road on which the vehicle V travels, and a period of time for which the vehicle speed is kept less than a predetermined value (e.g., less than 3 km/h) due to the traffic congestion is equal to or longer than the time required for the VVT active test.

More specifically, the communication module 8 receives information about traffic congestion on the road, and the ECU 100 determines, based on the traffic congestion information, whether a period of time for which the vehicle speed is kept less than the predetermined value, as counted from a point in time at which the vehicle speed becomes less than the predetermined value, is surely equal to or longer than the time required for the VVT active test. If the ECU 100 determines that the period for which the vehicle speed is kept less than the predetermined value is shorter than the time required for the VVT active test, the VVT active test is not carried out. On the other hand, if the ECU 100 determines that the period for which the vehicle speed is kept less than the predetermined value is surely equal to or longer than the time required for the VVT active test, the VVT active test is started.

The traffic congestion information or road conditions can be obtained from well-known Vehicle Information and Communication System (VICS) (registered trademark), for example.

In this embodiment, when the period for which the vehicle speed is kept less than the predetermined value is expected to be equal to or longer than the time required for the VVT active test, the ECU 100 activates the OCV 200$in$ and starts the VVT active test at the same time that the vehicle speed becomes less than the predetermined value. In this case, a diagnosis period (a period for which the vehicle speed is less than the predetermined value) sufficient to complete the VVT active test is secured, and a normal operation request is less likely or unlikely to be generated on the VVT mechanism 53 due to acceleration of the vehicle V in the middle of the VVT active test. Therefore, the VVT active test can be normally completed without being wasted. Also, the VVT active test is carried out each time the period for which the vehicle speed is kept less than the predetermined value is expected to be equal to or longer than the time required for the VVT active test; therefore, the VVT active test can be conducted at a high frequency, and an abnormality determination (a determination as to occurrence of an abnormality in the VVT mechanism 53) can be made at an early opportunity.

Other Embodiments

This disclosure is not limited to the illustrated embodiments, but may be subjected to all modifications and applications embraced by the appended claims and equivalents thereof.

For example, in each of the illustrated embodiments, the VVT active test is conducted on the VVT mechanism 53 provided on the intake side. However, the disclosure is not limited to this application, but may be applied to the case where the VVT active test is conducted on a VVT mechanism provided on the exhaust side, in an engine including the VVT mechanism on the exhaust side. In this case, according to the technical concept of the first embodiment, the ECU 100 determines whether the current light color of the traffic light 310 is "red", and, when the vehicle V stops, the time it takes until the light color turns from "red" to "green" is equal to or longer than the time required for the VVT active test. If the ECU 100 determines that the above-mentioned time is secured, the VVT active test on the exhaust-side VVT mechanism is started. Also, in the case where the VVT active test on the intake-side VVT mechanism 53 and the VVT active test on the exhaust-side VVT mechanism are continuously conducted, the ECU 100 determines, according to the technical concept of the first embodiment, whether the current light color of the traffic light 310 is "red", and, when the vehicle V stops, the time it takes until the light color turns from "red" to "green" is equal to or longer than the time required for the VVT active tests to be continuously conducted with respect to the respective VVT mechanisms. If the ECU 100 determines that the above time is secured, the VVT active tests are continuously conducted on the respective VVT mechanisms.

In each of the illustrated embodiments, when the ECU 100 determines whether the response speed of the VVT mechanism 53 is equal to or less than the preset abnormality determination threshold value, it detects change of the rotational phase of the intake camshaft 51 based on the output signal from the cam angle sensor 67, and determines that an abnormality occurs in the VVT mechanism 53 when the amount of change of the rotational phase per unit time is equal to or less than the abnormality determination threshold value. However, the disclosure is not limited to this arrangement, but the ECU 100 may detect change of the engine speed due to operation of the VVT mechanism 53, and may determine that an abnormality occurs in the VVT mechanism 53 when a deviation of the detected change of the engine speed, from change thereof in the case where the VVT mechanism 53 is normal, is equal to or larger than a predetermined amount.

The disclosure may be applied to the case where an active test is conducted on an electrically operated VVT mechanism.

In each of the illustrated embodiments, the active test (VVT active test) is conducted on the VVT mechanism 53 as the abnormality diagnosis target device. This disclosure is not limited to this, but may be applied to the case where an active test is conducted on other devices. For example, accessories, such as an air conditioner, lighting equipment, and various motors, may be operated for the sake of an active test, and it may be determined that no abnormality occurs in the accessories if a deviation of the amount of change (so-called idle-up amount) of the engine speed during the test, from the amount of change of the engine speed when the accessories are normally operated, is within a predetermined range. If the deviation is outside the predetermined range, it may be determined that an abnormality occurs in the accessories.

This disclosure may also be applied to an active test for determining whether sensors operate normally. For example, if a deviation of the amount of change of a signal value of an output signal of the actual air-fuel ratio sensor 65 when the quantity of fuel injected from the injector 35 is changed slightly, during an active test of the air-fuel ratio sensor 65, from the amount of change of the signal value of the output signal when the air-fuel ratio sensor 65 operates normally, is within a predetermined range, it may be determined that no abnormality occurs in the air-fuel ratio sensor 65. If the above-indicated amount of deviation is outside the predetermined range, it may be determined that an abnormality occurs in the air-fuel ratio sensor 65. In this case, the air-fuel ratio sensor 65 corresponds to the abnormality diagnosis target device according to the disclosure, and the injector 35 (more specifically, an electromagnetic solenoid, or the like, incorporated in the injector 35) corresponds to the actuator according to the disclosure.

In each of the illustrated embodiments, the disclosure is applied to the conventional vehicle V on which only the engine 1 is installed as a drive power source. However, this disclosure is not limited to this application, but may be applied to a hybrid vehicle on which an engine and an electric motor are installed as drive power sources. The disclosure may also be applied to a vehicle having an idling-stop function of stopping an engine while the vehicle is stopped. When an active test is conducted during idling stop (during stop of the engine), the amount of change of the engine speed as described above does not appear; therefore, change of the abnormality diagnosis target device during the active test is detected by sensing (sensing change of the rotational phase of the intake camshaft 51 by use of the cam angle sensor 67 in the VVT active test as described above).

This disclosure may be applied to a technology for appropriately setting the timing of implementation of the VVT active test conducted during the stoppage period of the vehicle.

In the first aspect of the disclosure, the abnormality diagnosis target device may be a variable valve mechanism. The length of time required for the abnormality diagnosis of the variable valve mechanism may be one of a length of time required to shift a valve opening and closing timing to the most retarded timing after shifting the valve opening and closing timing to the most advanced timing, and a length of time required to shift the valve opening and closing timing to the most advanced timing after shifting the valve opening and closing timing to the most retarded timing.

In the abnormality diagnosis of the variable valve mechanism, the electronic control unit sends a command signal (e.g., duty control signal) for shifting the valve opening and closing timing to the most retarded timing after shifting it to the most advanced timing, or a command signal for shifting the valve opening and closing timing to the most advanced timing after shifting it to the most retarded timing, to the variable valve mechanism, so as to determine whether operation of the variable valve mechanism is normally performed over the entire range in which the valve opening and closing timing can be varied. Then, when the period for which the vehicle speed is less than the predetermined value is expected to be equal to or longer than the time required for an abnormality diagnosis of the variable valve mechanism, the abnormality diagnosis of the variable valve mechanism is started. Therefore, the vehicle is less likely or unlikely to be accelerated in the middle of the abnormality diagnosis of the variable valve mechanism, and the abnormality diagnosis of the variable valve mechanism can be normally completed without being wasted.

In the first aspect of the disclosure, the vehicle outside information concerning the period of time for which the vehicle speed is less than the predetermined value may be information about a time until a traffic light installed on a road on which the vehicle travels turns green, when the vehicle stops in response to the traffic light that is red. The electronic control unit may be configured to determine whether a length of time from a point in time at which the vehicle stops in response to the traffic light that is red to a point in time at which the traffic light turns green is expected to be equal to or longer than the length of time required for the abnormality diagnosis of the abnormality diagnosis target device.

Generally, when the vehicle stops because the traffic light is red, the vehicle is kept in a stopped state until the traffic light turns green. By utilizing this, according to this disclosure, the electronic control unit obtains information about the time until the traffic light turns green when the vehicle stops at the red light, as the vehicle outside information concerning the period of time (vehicle stoppage period) for which the vehicle speed is less than the predetermined value, and starts an abnormality diagnosis of the abnormality diagnosis target device, when the length of time from when the vehicle stops in response to the traffic light that is red until when the traffic light turns green is expected to be equal to or longer than the time required for the abnormality diagnosis of the abnormality diagnosis target device. Thus, it is determined (assured) that the vehicle is less likely or unlikely to be started in the middle of the abnormality diagnosis, and the abnormality diagnosis can be normally completed without being wasted.

In the first aspect of the disclosure, the vehicle may include a vehicle-mounted camera that captures an image in front of the vehicle. The electronic control unit may be configured to determine whether a traffic light in front of the vehicle is red, based on information from the vehicle-mounted camera. When the electronic control unit determines that the traffic light in front of the vehicle is red, and determines that the length of time from the point in time at which the vehicle stops in response to the traffic light that is red to the point in time at which the traffic light turns green is expected to be equal to or longer than the length of time required for the abnormality diagnosis of the abnormality diagnosis target device, the electronic control unit may be configured to activate the actuator and start the abnormality diagnosis of the abnormality diagnosis target device as the vehicle stops.

With the above arrangement, it is reliably assured that the vehicle is stopped because the traffic light in front of the vehicle is red, and it can be determined with further improved reliability that the period for which the vehicle is stopped is equal to or longer than the time required for abnormality diagnosis of the abnormality diagnosis target device. Thus, it can be determined that the vehicle is less likely or unlikely to be started in the middle of the abnormality diagnosis, and the abnormality diagnosis can be normally completed without being wasted.

In the first aspect of the disclosure, the vehicle outside information concerning the period of time for which the vehicle speed is less than the predetermined value may be information about a period of time for which the vehicle speed is kept less than the predetermined value due to traffic congestion. The electronic control unit may be configured to determine whether the period of time for which the vehicle speed is kept less than the predetermined value due to the traffic congestion is expected to be equal to or longer than the length of time required for the abnormality diagnosis of the abnormality diagnosis target device.

Generally, when traffic congestion occurs on a road, the vehicle speed is kept less than the predetermined value. By utilizing this, according to this disclosure, the electronic control unit obtains information about the period for which the vehicle speed is kept less than the predetermined value due to traffic congestion on the road, as the information concerning the period for which the vehicle speed is less than the predetermined value, and starts an abnormality diagnosis of the abnormality diagnosis target device, when the period for which the vehicle speed is kept less than the predetermined value is expected to be equal to or longer than the time required for the abnormality diagnosis of the abnormality diagnosis target device. Thus, it can be determined that the vehicle is less likely or unlikely to be accelerated in the middle of the abnormality diagnosis, and the abnormality diagnosis can be normally completed without being wasted.

What is claimed is:

1. An abnormality diagnosis system for an internal combustion engine, the internal combustion engine being installed on a vehicle, the internal combustion engine including an actuator, the abnormality diagnosis system comprising an electronic control unit configured to:
receive vehicle outside information concerning a period of time for which a vehicle speed is less than a predetermined value;
determine whether the period of time for which the vehicle speed is less than the predetermined value is expected to be equal to or longer than a length of time required for an abnormality diagnosis of an abnormality diagnosis target device; and
activate the actuator and start the abnormality diagnosis of the abnormality diagnosis target device as the vehicle speed becomes lower than the predetermined value, when the electronic control unit determines that the period of time for which the vehicle speed is lower than the predetermined value is expected to be equal to or longer than the length of time required for the abnormality diagnosis of the abnormality diagnosis target device.

2. The abnormality diagnosis system according to claim 1, wherein:
the abnormality diagnosis target device is a variable valve mechanism; and
the length of time required for the abnormality diagnosis of the variable valve mechanism is one of a length of time required to shift a valve opening and closing timing to the most retarded timing after shifting the valve opening and closing timing to the most advanced timing, and a length of time required to shift the valve opening and closing timing to the most advanced timing after shifting the valve opening and closing timing to the most retarded timing.

3. The abnormality diagnosis system according to claim 1, wherein:
the vehicle outside information concerning the period of time for which the vehicle speed is less than the predetermined value comprises information about a time until a traffic light installed on a road on which the vehicle travels turns green, when the vehicle stops in response to the traffic light that is red; and
the electronic control unit is configured to determine whether a length of time from a point in time at which the vehicle stops in response to the traffic light that is red to a point in time at which the traffic light turns green is expected to be equal to or longer than the length of time required for the abnormality diagnosis of the abnormality diagnosis target device.

4. The abnormality diagnosis system according to claim 3, wherein:
the vehicle includes a vehicle-mounted camera that captures an image in front of the vehicle;
the electronic control unit is configured to determine whether a traffic light in front of the vehicle is red, based on information from the vehicle-mounted camera; and
when the electronic control unit determines that the traffic light in front of the vehicle is red, and determines that the length of time from the point in time at which the vehicle stops in response to the traffic light that is red to the point in time at which the traffic light turns green is expected to be equal to or longer than the length of time required for the abnormality diagnosis of the abnormality diagnosis target device, the electronic control unit is configured to activate the actuator and start the abnormality diagnosis of the abnormality diagnosis target device as the vehicle stops.

5. The abnormality diagnosis system according to claim 1, wherein:
- the vehicle outside information concerning the period of time for which the vehicle speed is less than the predetermined value comprises information about a period of time for which the vehicle speed is kept less than the predetermined value due to traffic congestion; and
- the electronic control unit is configured to determine whether the period of time for which the vehicle speed is kept less than the predetermined value due to the traffic congestion is expected to be equal to or longer than the length of time required for the abnormality diagnosis of the abnormality diagnosis target device.

6. An abnormality diagnosis method for an internal combustion engine, the internal combustion engine being installed on a vehicle, the internal combustion engine including an actuator, the vehicle including an electronic control unit, the abnormality diagnosis method comprising:

- receiving vehicle outside information concerning a period of time for which a vehicle speed is less than a predetermined value, by the electronic control unit;
- determining, by the electronic control unit, whether the period of time for which the vehicle speed is less than the predetermined value is expected to be equal to or longer than a length of time required for an abnormality diagnosis of an abnormality diagnosis target device; and
- activating the actuator and starting the abnormality diagnosis of the abnormality diagnosis target device as the vehicle speed becomes lower than the predetermined value, when the electronic control unit determines that the period of time for which the vehicle speed is lower than the predetermined value is expected to be equal to or longer than the length of time required for the abnormality diagnosis of the abnormality diagnosis target device.

* * * * *